Figure 1:
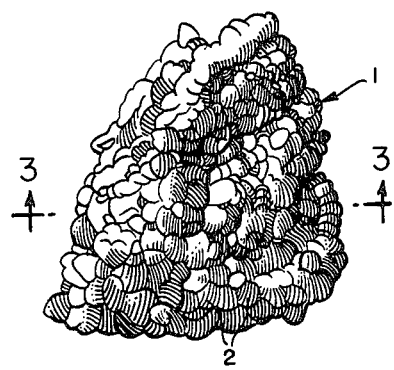

March 23, 1965 M. C. SCHIEBEL 3,174,864

SNACK FOOD

Filed April 18, 1962

INVENTOR:
MATILDA CORA SCHIEBEL
BY
ATT'YS 3,174,864
SNACK FOOD
Matilda Cora Schiebel, P.O. Box 361, Cole Road,
Wheaton, Ill.
Filed Apr. 18, 1962, Ser. No. 188,369
1 Claim. (Cl. 99—1)

This invention, in general, relates to food products and processes of manufacture thereof. They are crisp, curled, chip-like or flake-like products of the snack variety.

One of the unique and advantageous features of the snack foods of this invention is their natural white color. The crisp flake or chip products marketed heretofore generally have a natural brown shade. The natural white color of the flakes or chips of this invention allows their production in their natural white color or in any desired light of dark color through the use of edible dyes to vary their color.

These food products have a crisp, crunchy texture, but at the same time the flakes or chips have sufficient inherent strength whereby they can be packaged and shipped under normal shipping conditions with little, if any, crumbling, breaking or the like.

The flakes or chips of the invention take on an almost endless variety of shapes and forms. The drawing herewith shows the curled shape and texture of a flake or chip produced in the practice of the invention.

Figure 2:
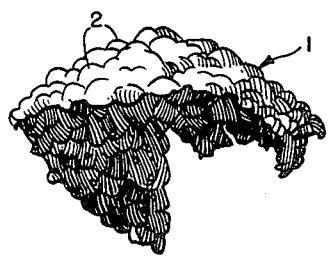
Figure 3:
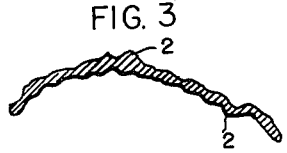

In the drawings:
FIG. 1 is a side elevation of a flake or chip of the invention.
FIG. 2 is a top plan view of the chip of FIG. 1.
FIG. 3 is a section of a thin slice of the chip of FIG. 1 taken on section 3—3 of FIG. 1.

Briefly, the snack foods of the invention comprise small pieces of comminuted or grated popped popcorn in a carbohydrate base deep-fried into naturally white, crisp, curled, flavorful, textured chips or flakes. The carbohydrates used to best advantage in the practice of the invention are tapioca flour and potato starch.

If a crisp product having low shipping breakage and good bite characteristics is to be produced, the snack foods of the invention are best prepared by the following preferred practice of the invention. Amounts of ingredients are given to show proportions or relative quantities by weight of ingredients, which can be adjusted proportionally in using larger or smaller amounts.

Approximately 35–37 parts of tapioca flour are mixed with about 9–12 parts of popped popcorn which was previously grated, comminuted or similarly cut into small pieces. White popcorn is preferred, although yellow varieties may be used.

The tapioca flour-popcorn mixture is stirred into 118–178 parts boiling water. The mixture is cooked until it is clear, usually in a period of 1–2 minutes. The heat is then removed, and 31–33 parts of potato starch are added quickly along with an amount of salt to taste.

The mass, while still warm to touch, is rolled out into a thin layer or layers in the order of $\frac{1}{32}''$ to $\frac{1}{16}''$ thick. The layer is cut into small sections, e.g., one inch to two inch squares, and is allowed to dry. As the product dries, the edges of the cut pieces usually curl slightly upwardly. The product is dried until the pieces are somewhat brittle. It may be carried out at ambient temperature in open air or in commercial dehydrators or the like if an accelerated drying time is desired.

After the pieces have dried, they are deep-fried in a deep-frying fat or oil at 380–400° F. The product fries to crisp, white, textured, curled chips or flakes instantaneously.

The drawing shows a deep-fried flake or chip 1 of the invention. The curled shape of the product can be seen particularly in FIGS. 2 and 3. The surface of the flakes or chips is textured by small knobs 2. These knobs are formed by the pieces of comminuted popped popcorn held together in the flake or chip by the dried and deep-fried tapioca flour-potato starch base.

A preferred form of the invention is illustrated in the following example wherein the parts are parts by weight.

*Example*

A mixture of 36 parts of tapioca flour and 10 parts of grated, popped popcorn is added to 120 parts of boiling water and is cooked for about one minute until the cooked mixture is clear. Heating of the cooked mixture is discontinued, and 32 parts of potato starch are added to the cooked mixture along with a small amount of salt. The mixture is stirred sufficiently to disperse the potato starch and salt evenly through the cooked mixture. The resultant plastic mass is rolled out while still warm into thin layers (approximately $\frac{1}{16}$ inch) on a shallow pan or pans.

The layers are cut into squares of $1\frac{1}{2}''$ to $2''$ and are allowed to dry until the mass is clear. The edges of the cut squares curl slightly in the drying process, and the squares release from the pan as somewhat brittle masses. The squares are then deep fried at 380° F. in a deep frying fat, e.g., peanut oil, vegetable fat shortening, special commercial deep frying fats, etc.

The weight proportions recited previously are tabulated as follows:

|  | Parts |
|---|---|
| Tapioca flour | 35–37 |
| Comminuted popped popcorn | 9–12 |
| Potato starch | 31–33 |
| Water | 118–178 |

When the tapioca flour in the above proportions is varied substantially above the stated proportion, the resultant deep-fried product has a tougher bite. When it is substantially below said proportion, the deep-fried product is more crumbly. When a relatively thin chip or flake is desired, the proportion of water should be at the higher end of the range while water at the lower end of the range gives a relatively thick walled chip or flake.

The invention is hereby claimed as follows:
A snack food consisting essentially of thin, irregularly curved chips, having a knobbed, textured surface, of a deep fat-fried carbohydrate base consisting essentially of tapioca flour and potato starch with small pieces of comminuted, popped popcorn embodied therein in the relative weight proportions of 9–12 parts of popped popcorn, 35–37 parts of tapioca flour and 31–33 parts of potato starch.

References Cited by the Examiner
UNITED STATES PATENTS

| 1,383,290 | 7/21 | Cressey | 99—138 |
| 2,168,246 | 8/39 | Shepherd | 99—83 X |

A. LOUIS MONACELL, *Primary Examiner.*
BEATRICE H. STRIZAK, *Examiner.*